US009133314B2

(12) United States Patent
Akcora et al.

(10) Patent No.: US 9,133,314 B2
(45) Date of Patent: Sep. 15, 2015

(54) ANISOTROPIC SELF-ASSEMBLY OF NANOPARTICLES IN COMPOSITES

(75) Inventors: Pinar Akcora, New York, NY (US); Sanat K. Kumar, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 1159 days.

(21) Appl. No.: 12/746,865

(22) PCT Filed: Dec. 16, 2008

(86) PCT No.: PCT/US2008/013769
§ 371 (c)(1),
(2), (4) Date: Jul. 27, 2010

(87) PCT Pub. No.: WO2009/078985
PCT Pub. Date: Jun. 25, 2009

(65) Prior Publication Data
US 2010/0303874 A1    Dec. 2, 2010

Related U.S. Application Data

(60) Provisional application No. 61/014,350, filed on Dec. 17, 2007, provisional application No. 61/019,516, filed on Jan. 7, 2008, provisional application No. 61/128,216, filed on May 20, 2008.

(51) Int. Cl.
*B82Y 30/00* (2011.01)
*C08J 5/00* (2006.01)

(52) U.S. Cl.
CPC .............. *C08J 5/005* (2013.01); *B82Y 30/00* (2013.01); *C08J 2300/12* (2013.01);
(Continued)

(58) Field of Classification Search
CPC ...... B82Y 30/00; C08J 5/005; C08J 2333/12; C08J 2333/10; C08J 2333/08; C08J 2333/06; C08J 2300/12; C08J 2325/02; C08J 2325/06
USPC ................................................. 524/445, 269
See application file for complete search history.

(56) References Cited

U.S. PATENT DOCUMENTS 6,503,295 B1   1/2003   Koros et al.
6,627,314 B2   9/2003   Matyjaszewski
(Continued)

FOREIGN PATENT DOCUMENTS

WO    WO-0224310 A1    3/2002
WO    WO-2009027376 A1    3/2009
WO    WO-2009078985 A1    6/2009

OTHER PUBLICATIONS

"International Application Serial No. PCT/US2008/013769, International Search Report mailed Mar. 19, 2009", p. 220.
(Continued)

*Primary Examiner* — Ling Choi
*Assistant Examiner* — David L Miller
(74) *Attorney, Agent, or Firm* — Schwegman Lundberg & Woessner, P.A.

(57) ABSTRACT

An anisotropic self assembled structure comprises isotropic grafted nanoparticles in a polymeric matrix, the self-assembled structure comprising (a) a one-dimensional string of the grafted nanoparticles within the matrix, the string having a width of one nanoparticle and a length of 1-10 nanoparticles, (b) a substantially two-dimensional sheet of the grafted nanoparticles within the matrix, the sheet having a length and a breadth of at least one micron respectively, wherein the sheet is about 2-5 nanoparticles in thickness, or (c) a plurality of three dimensionally interconnected structures where the width of each of the structures is 1-10 nanoparticles; wherein each grafted nanoparticle comprises a substantially spherical inorganic core nanoparticle and a polymeric brush structure grafted thereto.

39 Claims, 11 Drawing Sheets

(52) U.S. Cl.
CPC ......... *C08J 2325/02* (2013.01); *C08J 2325/06* (2013.01); *C08J 2333/06* (2013.01); *C08J 2333/08* (2013.01); *C08J 2333/10* (2013.01); *C08J 2333/12* (2013.01)

(56) References Cited

U.S. PATENT DOCUMENTS

| | | | |
|---|---|---|---|
| 6,737,364 | B2 | 5/2004 | Black et al. |
| 6,808,557 | B2 | 10/2004 | Holbrey et al. |
| 7,837,909 | B2 | 11/2010 | Chmelka et al. |
| 7,846,496 | B2 | 12/2010 | Liu et al. |
| 2002/0106513 | A1* | 8/2002 | Matyjaszewski et al. .... 428/404 |
| 2005/0084607 | A1* | 4/2005 | Wang ........................... 427/212 |
| 2006/0286378 | A1 | 12/2006 | Chiruvolu et al. |
| 2007/0020749 | A1 | 1/2007 | Nealey et al. |
| 2007/0026069 | A1 | 2/2007 | Shastri et al. |
| 2009/0011160 | A1 | 1/2009 | Paulussen et al. |
| 2012/0277377 | A1 | 11/2012 | Kysar et al. |

OTHER PUBLICATIONS

"International Application Serial No. PCT/US2008/013769, Written Opinion mailed Mar. 19, 2009", p. 237.
"Nanoparticle Networks Reduce the Flammability of Polymer Nanocomposites", *Nature Materials,* 4(12), (2005), 928-933.
Alexandre, M., et al., "Polymer-Layered Silicate Nanocomposites: Preparation, Properties and Uses of a New Class of Materials", *Materals Science & Engineering R-Reports,* 28(1-2), (2000), 1-63.
Lin, Y., et al., "Self-Directed Self-Assembly of Nanoparticle/Copolymer Mixtures", *Nature,* 434(7029), (2005), 55-59.
McConnell, H. M., et al., "Brownian Motion of Lipid Domains in Electrostatic Traps in Monolayers", *J. Phys. Chem.,* 94, (1990), 8965-8968.
Moniruzzaman, M., et al., "Polymer Nanocomposites Containing Carbon Nanotubes", *Macromolecules,* 39(16), (2006), 5194-5205.
Ray, S. S., et al., "Polymer/Layered Silicate Nanocomposites: A Review From Preparatiion to Processing", *Progress in Polymer Science,* 28(11), (2003), 1539-1641.
Tang, Z., et al., "Self-Assembly of CdTe Nanocrystals Into Free Floating Sheets", *Science,* 314, (2006), 274-278.
Thostenson, E. T., et al., "Advances in the Science and Technology of Carbon Nanotubes and Their Composites: A Review", *Composites Science and Technology,* 61(131, (2001), 1899-1912.
Yan, L. F., et al., "Dipolar Chains and 2D Aligned Stripes of Polymer-Coated Magnetic Iron Colloid", *Journal of Applied Polymer Science,* 101(6), (2006), 4211-4215.
U.S. Appl. No. 13/410,005, Examiner Interview Summary mailed May 14, 2014, 3 pgs.
U.S. Appl. No. 13/410,005, Non Final Office Action mailed Jan. 15, 2014, 8 pgs.
U.S. Appl. No. 13/410,005, Notice of Allowance mailed Jul. 18, 2014, 13 pgs.
U.S. Appl. No. 13/410,005, Response filed Jan. 2, 2014 to Restriction Requirement mailed Oct. 3, 2013, 7 pgs.
U.S. Appl. No. 13/410,005, Response filed May 15, 2014 to Non Final Office Action mailed Jan. 15, 2014, 12 pgs.
U.S. Appl. No. 13/410,005, Restriction Requirement mailed Oct. 3, 2013, 6 pgs.
Schmidt, P. G, "Polyethylene terephthalate structural studies", Journal of Polymer Science Part A: General Papers, 1(4), (Apr. 1963), 1271-1292.

\* cited by examiner

ANISOTROPIC SELF-ASSEMBLY OF NANOPARTICLES IN COMPOSITES

CROSS-REFERENCE TO RELATED APPLICATIONS

This application is a U.S. National Stage Filing under 35 U.S.C. 371 from International Patent Application Serial No. PCT/US2008/013769, filed Dec. 16, 2008, and published on Jun. 25, 2009 as WO 2009/078985 A1, which claims the priority benefit under 35 U.S.C. 119(e) to U.S. Provisional Application Ser. No. 61/014,350, filed Dec. 17, 2007; U.S. Provisional Application Ser. No. 61/019,516, filed Jan. 7, 2008; and U.S. Provisional Application Ser. No. 61/128,216, filed May 20, 2008, the contents of which applications and publication are incorporated herein by reference in their entirety.

STATEMENT REGARDING FEDERALLY SPONSORED RESEARCH OR DEVELOPMENT

This invention was made with government support under NSF DMR-0117792 awarded by the National Science Foundation Division of Materials Research and the Nanoscale Science and Engineering Initiative. The government has certain rights in the invention.

BACKGROUND

The self-assembly of isotropic nanoparticles into anisotropic structures within polymer melts has the potential to improve the electrical and mechanical properties of composite materials. Particle self-assembly has been used as a route to material assembly. Polymer composites incorporating nanostructures may provide otherwise inaccessible materials. Self-assembly of nanostructures is potentially an efficient and cost-effective method for manufacturing such materials.

SUMMARY

The subject matter disclosed and claimed herein is directed to anisotropic nanoparticulate structures, to methods for their preparation, and to methods of use. In various embodiments, the disclosed subject matter provides an anisotropic self-assembled structure comprising a plurality of substantially isotropic grafted nanoparticles in a polymeric matrix, the self-assembled structure comprising (a) a one-dimensional string of the grafted nanoparticles within the matrix, the string having a width of one nanoparticle and a length of 1-10 nanoparticles, (b) a substantially two-dimensional sheet of the grafted nanoparticles within the matrix, the sheet having a length and a breadth of at least one micron respectively, wherein the sheet is about 2-5 nanoparticles in thickness, or (c) a plurality of three dimensionally interconnected structures where the width of each of the structures is 1-10 nanoparticles;

wherein each grafted nanoparticle comprises a substantially spherical inorganic core nanoparticle and an organic brush structure grafted thereto, wherein the brush structure comprises a plurality of grafted polymeric chains of a weight average molecular weight $M_g$, the polymeric matrix has a weight average molecular weight of M, and there is an average number of grafted polymeric chains per $nm^2$ of surface of the inorganic core nanoparticles D.

In various embodiments, the disclosed subject matter provides a method of preparing an anisotropic self-assembled structure of the disclosed subject matter, the method comprising forming a dispersion of a plurality of the grafted nanoparticles in the polymeric matrix, then, annealing the residue at a temperature above a glass transition temperature of the polymeric matrix for a duration of time sufficient to bring about formation of the self-assembled structure within the matrix.

In various embodiments, the disclosed subject matter provides synthetic substitute for bone or tooth enamel comprising a self-assembled structure disclosed herein, or of a self-assembled structure prepared by the method disclosed herein.

In various embodiments, the disclosed subject matter provides a fuel cell comprising a self-assembled structure disclosed herein, or of a self-assembled structure prepared by the method disclosed herein.

In various embodiments, the disclosed subject matter provides a flame-retardant material comprising a self-assembled structure disclosed herein, or of a self-assembled structure prepared by the method disclosed herein.

In various embodiments, the disclosed subject matter provides an electroconductive material comprising a self-assembled structure disclosed herein, or of a self-assembled structure prepared by the method disclosed herein.

Increased brush molecular mass ($M_g$) and increased grafting density have similar effects on the aggregation process, displaying spherical clusters, thicker to thin branched (continuous) structures yielding to sheets. The matrix homopolymer is 142 kDa in (B) and 42 kDa in (C). (D) USAXS data (symbols) and unified fits (solid line) of samples shown in the first row (first graph, 25 kg/mol=squares, 51 kg/mol=diamonds, 158 kg/mol=circles) and in the second row (second graph, 17 kg/mol=squares, 34 kg/mol=diamonds, 106 kg/mol=circles) of FIG. 3B, respectively. The fit parameters are reported in Table 3.

Figure 4:
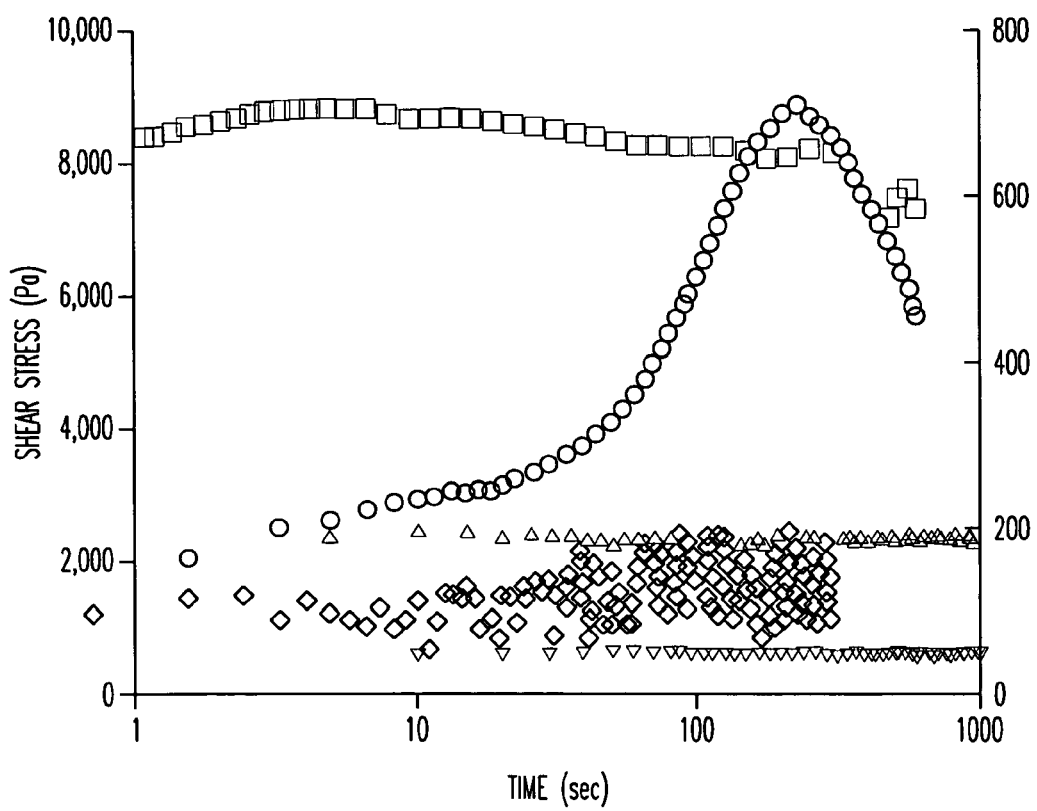

FIG. 4 shows shear stress response to steady-shear application at 180° C. at a shear rate of 0.1 $s^{-1}$ for composites with matrix M=42 kDa (inverted triangles=pure homopolymer, diamonds=nanocomposites) and 142 kDa (triangles=pure homopolymer, circles=nanocomposite). Each particle, on average, has 37 chains grafted to it, where each grafted chain was of molecular mass of 106 kDa. The squares represent data for a matrix with 142 kDa matrix but for nanoparticles which have 6 chains grafted to them, with each of them of MW 158 kDa. This sample is sheared at a rate of 0.2 $s^{-1}$. The left axis is for the M=142 kDa while the right axis is for the 42 kDa matrix.

FIG. 5 shows: (A) Detailed TEM of 5 mass % silica grafted with a 106 kDa polystyrene brush, with polystyrene matrix of M=17 kDa annealed for 5 d. It is readily apparent that the particles form short strings. (B) TEM micrographs of the blend of 5 mass % silica grafted with a 106 kDa PS in a 142 kDa PS homopolymer annealed for 5 d. from consecutive sections. Each section is approximately 100 nm thick. The numbers on the micrographs refer to the section number within a series of sections. The minimum lateral dimension of the sheet is determined by following the same structure in consecutive sections of the sample: we found that this sheet must be at least as large as 1.4 µm. (C) TEM micrograph of the composite with the 142 kDa matrix annealed for 5 days. The scale bar is 0.2 µm.

DETAILED DESCRIPTION

In various embodiments, the disclosed subject matter provides An anisotropic self-assembled structure comprising a plurality of substantially isotropic grafted nanoparticles in a polymeric matrix, the self-assembled structure comprising (a) a one-dimensional string of the grafted nanoparticles within the matrix, the string having a width of one nanoparticle and a length of 1-10 nanoparticles, (b) a substantially two-dimensional sheet of the grafted nanoparticles within the matrix, the sheet having a length and a breadth of at least one micron respectively, wherein the sheet is about 2-5 nanoparticles in thickness, or (c) a plurality of three dimensionally interconnected structures where the width of each of the structures is 1-10 nanoparticles;

wherein each grafted nanoparticle comprises a substantially spherical inorganic core nanoparticle and an organic brush structure grafted thereto, wherein the brush structure comprises a plurality of grafted polymeric chains of a weight average molecular weight $M_g$, the polymeric matrix has a weight average molecular weight of M, and there is an average number of grafted polymeric chains per $nm^2$ of surface of the inorganic core nanoparticles D.

In various embodiments, the invention provides the self-assembled structure of claim 1 wherein $M_g/M<1$ and 0.05 chains/$nm^2$<D<0.10 chains/$nm^2$, wherein the self-assembled structure comprises (b) a substantially two-dimensional sheet of the grafted nanoparticles within the matrix, the sheet having a length and a breadth of at least one micron respectively, wherein the sheet is about 2-5 nanoparticles in thickness, or (c) a plurality of three dimensionally interconnected structures where the width of each of the structures is 1-10 nanoparticles.

In various embodiments, the invention provides the self-assembled structure of claim 1 wherein 1<$M_g$/M<about 3 and 0.01 chains/nm2<D<about 0.10 chains/mn2, wherein the self assembled structure comprises (a) a one-dimensional string of the grafted nanoparticles within the matrix, the string having a width of one nanoparticle and a length of 1-10 nanoparticles, (b) a substantially two-dimensional sheet of the grafted nanoparticles within the matrix, the sheet having a length and a breadth of at least one micron respectively, wherein the sheet is about 2-5 nanoparticles in thickness, or (c) a plurality of three dimensionally interconnected structures where the width of each of the structures is 1-10 nanoparticles.

In various embodiments, the invention provides the self-assembled structure of claim 1 wherein about 3<$M_g$/M<about 7 and 0.01 chains/nm2<D<about 0.05 chains/mn2, wherein the self assembled structure comprises (a) a one-dimensional string of the grafted nanoparticles within the matrix, the string having a width of one nanoparticle and a length of 1-10 nanoparticles, (b) a substantially two-dimensional sheet of the grafted nanoparticles within the matrix, the sheet having a length and a breadth of at least one micron respectively, wherein the sheet is about 2-5 nanoparticles in thickness, or (c) a plurality of three dimensionally interconnected structures where the width of each of the structures is 1-10 nanoparticles.

For example, the self-assembled structure can comprise a plurality of layers of the substantially two-dimensional sheets stacked in layers.

For example, the self-assembled structure can have substantially all of the plurality of grafted nanoparticles with a respective inorganic core comprising silica.

For example, the self-assembled structure can include a brush structure that comprises polystyrene or poly(methylmethacrylate) chains.

The weight average molecular weight (M) of the polymeric matrix can be greater than about 120 kDa, or can be greater than about 150 kDa.

For example, the self-assembled structure in the polymeric matrix can comprise about 1-10% of a weight of the inorganic core, such as silica nanoparticles.

In various embodiments, the disclosed subject matter provides a method of preparing an anisotropic self-assembled structure of the disclosed subject matter, the method comprising forming a dispersion of a plurality of the grafted nanoparticles in the polymeric matrix, then, annealing the residue at a temperature above a glass transition temperature of the polymeric matrix for a duration of time sufficient to bring about formation of the self-assembled structure within the matrix.

For example, substantially all of the plurality of grafted nanoparticles prepared by a method disclosed herein can have a respective inorganic core comprising silica. For example, substantially all of the plurality of grafted nanoparticles prepared by a method disclosed herein can comprise an inorganic core with an average particle diameter of about 14±4 nm. More specifically, substantially all of the plurality of grafted nanoparticles can comprise an inorganic core with an average particle diameter of about 14±4 nm formed of silica.

For example, in some embodiments the weight average molecular weight ($M_g$) of the grafted organic chains of the brush structure can be about 100-120 kDa, provided that $M_g$ is less than the weight average molecular weight (M) of the polymeric matrix. More specifically, in these embodiments, when $M_g$ is about 100-120 Kda, M can be greater than about 120 kDa, or can be greater than about 150 kDa. More specifically, in these embodiments, the average number of grafted chains per $nm^2$ of inorganic nanoparticle surface can be greater than about 0.05 and less than about 0.10 chains/$mn^2$. In these embodiments, the self-assembled structure can comprise a substantially two-dimensional sheet of the grafted nanoparticles within the matrix, the sheet having a length and a breadth of at least one micron respectively, wherein the sheet is about 2-5 nanoparticles in thickness, or a plurality of three dimensionally interconnected structures where the width of each of the structures is 1-10 nanoparticles.

For example, in some embodiments the weight average molecular weight ($M_g$) of the grafted organic chains of the brush structure can be greater than the weight average molecular weight (M) of the polymeric matrix by a factor of up to about 3. More specifically, in these embodiments, the average number of grafted chains per $nm^2$ of inorganic nanoparticle surface can be greater than about 0.01 and less than about 0.10 chains/$mn^2$. In these embodiments, the self-assembled structure can comprise a one-dimensional string of the grafted nanoparticles within the matrix, the string having a width of one nanoparticle and a length of 1-10 nanoparticles, a substantially two-dimensional sheet of the grafted nanoparticles within the matrix, the sheet having a length and a breadth of at least one micron respectively, wherein the sheet is about 2-5 nanoparticles in thickness, or a plurality of three dimensionally interconnected structures where the width of each of the structures is 1-10 nanoparticles.

For example, in some embodiments the weight average molecular weight ($M_g$) of the grafted organic chains of the brush structure can be greater than the weight average molecular weight (M) of the polymeric matrix by a factor of about 3 up to about 7. More specifically, in these embodiments, the average number of grafted chains per $nm^2$ of inorganic nanoparticle surface can be greater than about 0.01 and less than about 0.05 chains/$mn^2$. In these embodiments, the self-assembled structure can comprise a one-dimensional string of the grafted nanoparticles within the matrix, the string having a width of one nanoparticle and a length of 1-10 nanoparticles, a substantially two-dimensional sheet of the grafted nanoparticles within the matrix, the sheet having a length and a breadth of at least one micron respectively, wherein the sheet is about 2-5 nanoparticles in thickness, or a plurality of three dimensionally interconnected structures where the width of each of the structures is 1-10 nanoparticles.

For example, the brush structure can comprise polystyrene chains. There can be about 25-45 grafted polymeric organic chains per nanoparticle.

For example, the polymeric matrix prepared by a method disclosed herein can comprise polystyrene or polymethylmethacrylate. The weight average molecular weight of the polymeric matrix can be greater than about 120 kDa, or can be greater than about 150 kDa.

More specifically, the self-assembled structure prepared by a method disclosed herein can comprise a one-dimensional string of the drafted nanoparticles within the matrix, the string having a width of one nanoparticle and a length of 1-10 nanoparticles.

More specifically, the self-assembled structure prepared by a method disclosed herein can comprise a substantially two-dimensional sheet of the grafted nanoparticles within the matrix, the sheet having a length and a breadth of at least one micron respectively, wherein the sheet is about 2-5 nanoparticles in thickness.

More specifically, the self-assembled structure prepared by a method disclosed herein can comprise a plurality of three dimensionally interconnected structures where the width of each of the structures is 1-10 nanoparticles.

Or, the self-assembled structure prepared by a method disclosed herein can comprise a plurality of layers of the substantially two-dimensional sheets stacked in layers.

More specifically, the self-assembled structure prepared by a method disclosed herein can comprise about 1-10 wt % of the inorganic core, such as silica.

In various embodiments, a method of preparing a self-assembled structure as disclosed herein can comprise forming a dispersion in a solvent, then casting the dispersion on a surface, then removing the solvent.

In annealing above a glass transition temperature of the polymeric matrix, the annealing temperature can be greater than about 150° C.

In annealing for a period of time sufficient to bring about formation of the self-assembled structure with the matrix, the annealing time can be about 1 to about 20 days.

Controlling the dispersion of nanoparticles into polymer matrices is a significant challenge in achieving property improvements in polymer nanocomposites. We have found that certain types of nanoparticles can exhibit self-assembly into highly anisotropic structures within a polymeric matrix when inorganic nanoparticles are coated with a brush structure comprising organic chains, then are dispersed within the matrix, when the weight average molecular weight of the organic chains of the brush structure, termed $M_g$, the weight average molecular weight of the polymeric matrix, termed M, and the average density of grafted chains per nm2 of inorganic nanoparticle surface, termed D, are within certain parameters as discussed herein. It is believed this is because the immiscible particle core and grafted polymer layer attempt to phase separate but are constrained by chain connectivity, which may be analogous to "microphase separation" in block copolymers and other amphiphiles. Similar to these amphiphiles, nanoparticles with a "polarizable" coating can self-assemble under a broad range of conditions into a variety of superstructures. This type of particle self-assembly has strongly beneficial consequences on the mechanical properties of the resulting nanocomposite.

Figure 2A:
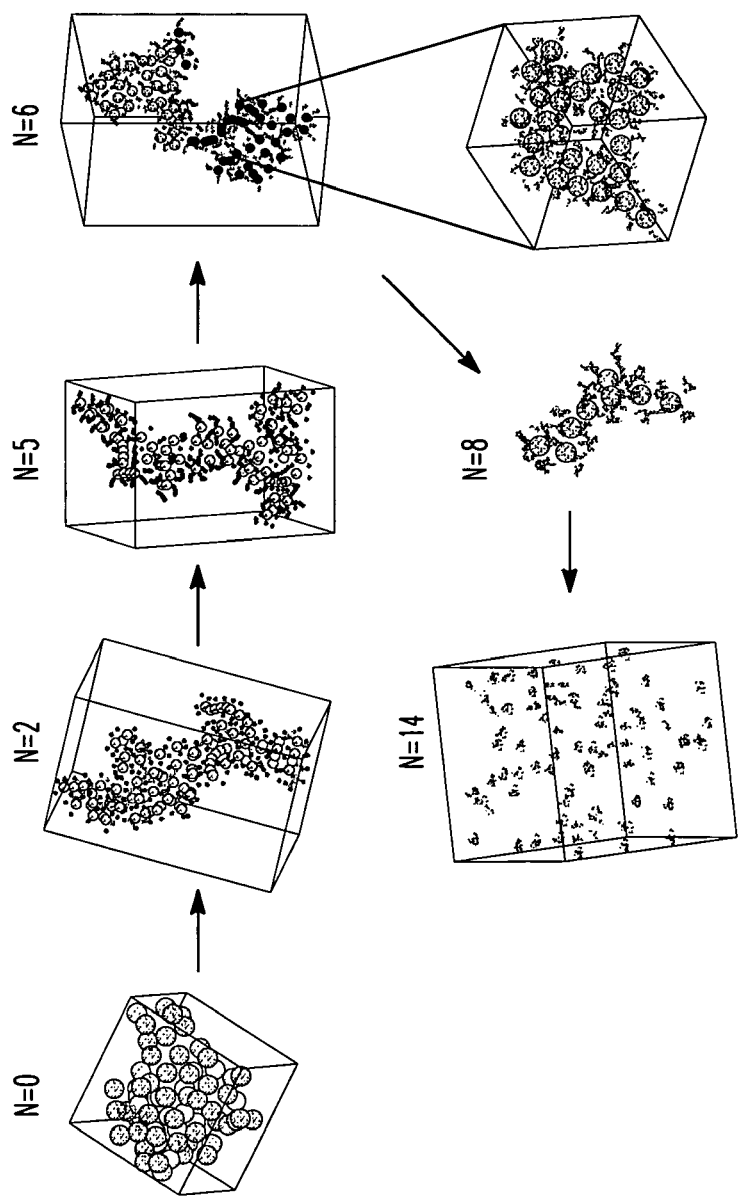
FIG. 2 shows: (A) Simulation snapshots for particles with six uniformly spaced grafts, going from bare particles forming spherical aggregates, to flattened cylinders with N=2; branched cylinder with thinner arms N=5; sheets with N=6 (sheet shown in the detail); long strings with N=8 (only one string shown); short chains with N=10 (not shown); and isolated particles with N=14. The stable state of the ungrafted particles under these conditions should be a crystal. Thus, the liquid droplet seen here is a metastable state. (B) Results of simulations and theory at different grafting densities. Polytetrahedra, i.e., sheets with a tetragonal packing of particles, and sheets with a two-dimensional hexagonal packing of particles are both designated as "sheets". Lines are predictions of analytical theory, points are from simulation. Circles—spherical aggregates, squares—sheets, triangles—strings, diamonds—well dispersed particles. (C) Experimentally-derived "morphology diagram" of polymer tethered particles mixed with matrix polymers. Circles represent spherical aggregates, squares are sheets and interconnected structures, triangles are short strings and diamonds are dispersed particles. The lines which separate different regions are merely guides to the eye.
Figure 2B:
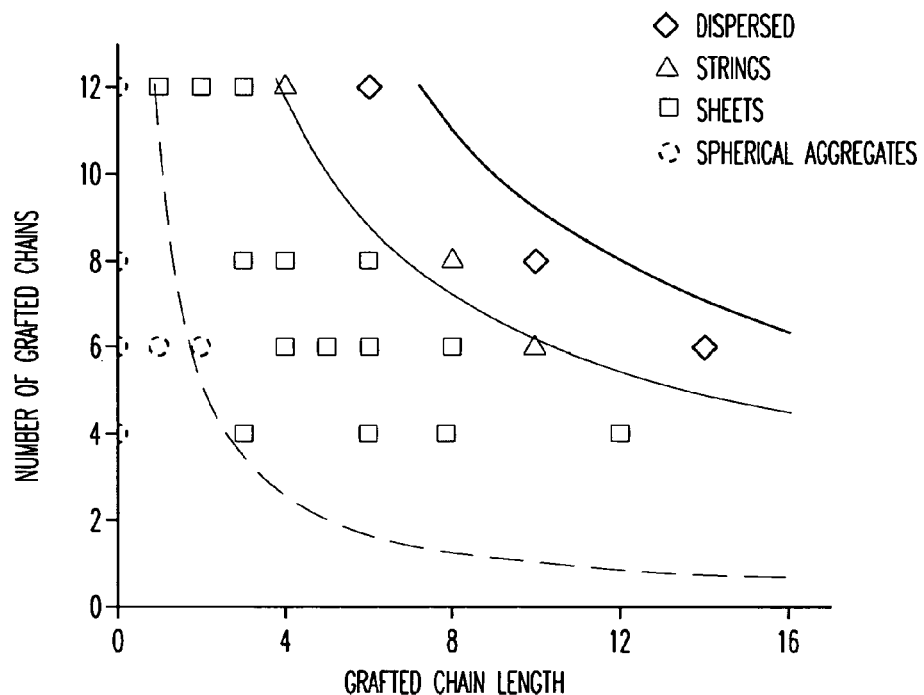
Figure 2C:
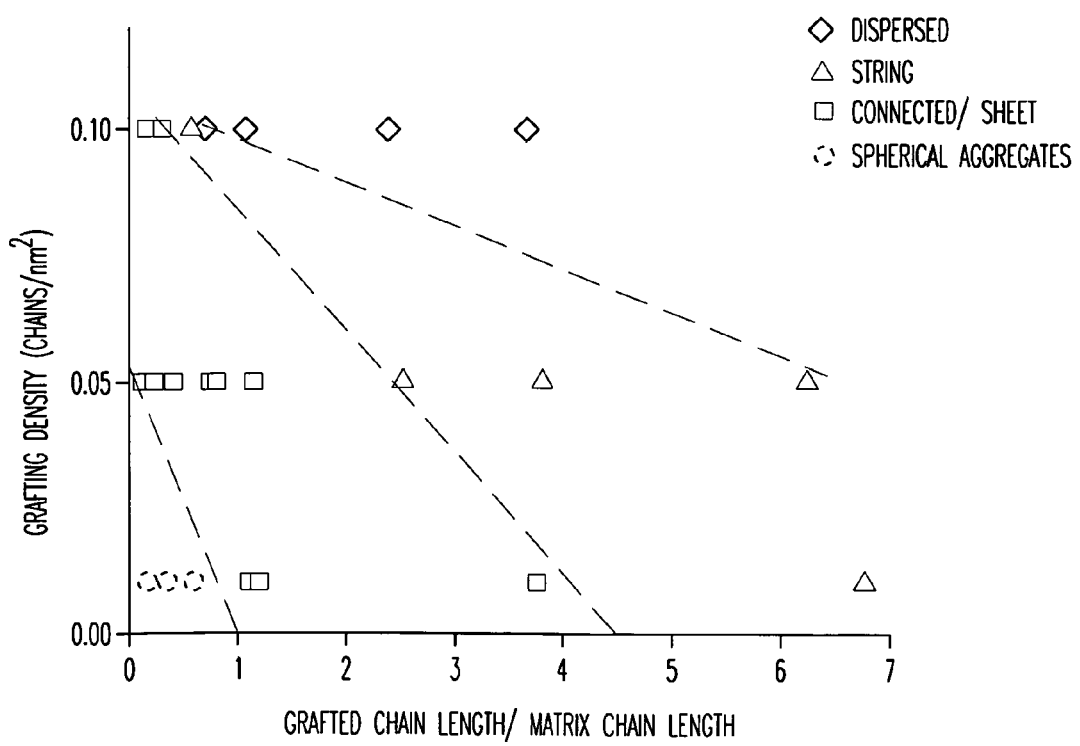

The inventors herein have surprisingly found that spherical nanoparticles grafted uniformly with organic chains, i.e., oligomers or polymers, and dispersed in a homopolymer matrix with the same chemical structure as the brush but of a greater length (molecular weight), self-assemble into highly anisotropic three-dimensionally articulated strings, sheets, and interconnected 3-dimensional structures even at relatively low particle loadings. It is believed that the molecular origin of this result is an interplay between the short-ranged repulsive forces of the hard particle core and the soft corona and the long-range attraction interaction between the particles. The ratio between the average grafted chain length (weight average molecular weight of grafted chains) $M_g$, and the average matrix chain length (weight average molecular weight of matrix chains) M, can range from a fractional value of less than one up to a maximum of about 7. Different grafted chain densities D for a given ratio produce results as are shown in FIG. 2C.

For ratios Mg/M of less than one, a value of D ranging between about 0.05 and 0.10 chains/nm2 is found to produce connected or sheet type anisotropic self-assembled structures. At lower D values in this ratio range, isotropic spherical aggregates are observed.

For ratios $M_g/M$ of about one to about three, lower D values of about 0.01 to about 0.05 chains/nm2 are found to produce connected or sheet type anisotropic self-assembled structures, whereas higher D values of about 0.05 to 0.10 chains/nm2 are found to produce string type self-assembled structures.

For ratios $M_g/M$ of about three to about seven, only lower D values of about 0.01 to about 0.05 chains/nm2 are found to produce self-assembled structures, largely of the string type. At higher D values in this ratio range, substantially uniform dispersions are observed.

For example, silica nanoparticles, coated with organic brush structures comprising a plurality of oligomeric or polymeric chains, termed "grafted nanoparticles", interacting isotropically with each other can surprisingly assemble into highly anisotropic strings, sheets, or three dimensionally interconnected structures at loadings such as about 1% to about 10% by weight. Each grafted nanoparticle comprises an inorganic core and an organic coating comprising a brush structure grafted thereto, wherein the brush structure comprises a plurality of oligomeric or polymeric organic chains of a weight average molecular weight $M_g$, the polymeric matrix has a weight average molecular weight of M. Within a range of $M_g/M$ ratios and chain densities D, as described herein, self-assembly can occur. For example, the inorganic core of each nanoparticle can be a spherical silica nanoparticle about 14±4 nm in diameter. The silica particles grafted with polystyrene chains ("brush") are mixed with a matrix homopolymer with a similar chemical structure as the brush chains, and then are subjected to extended annealing at varying times (between 1 to 19 days) at a temperature greater than the glass transition temperature of the polymeric matrix, for example at 150° C. for a polystyrene matrix, in a vacuum oven. We have observed the evolution of structures with time using transmission electron microscopy (TEM).

Figure 1:
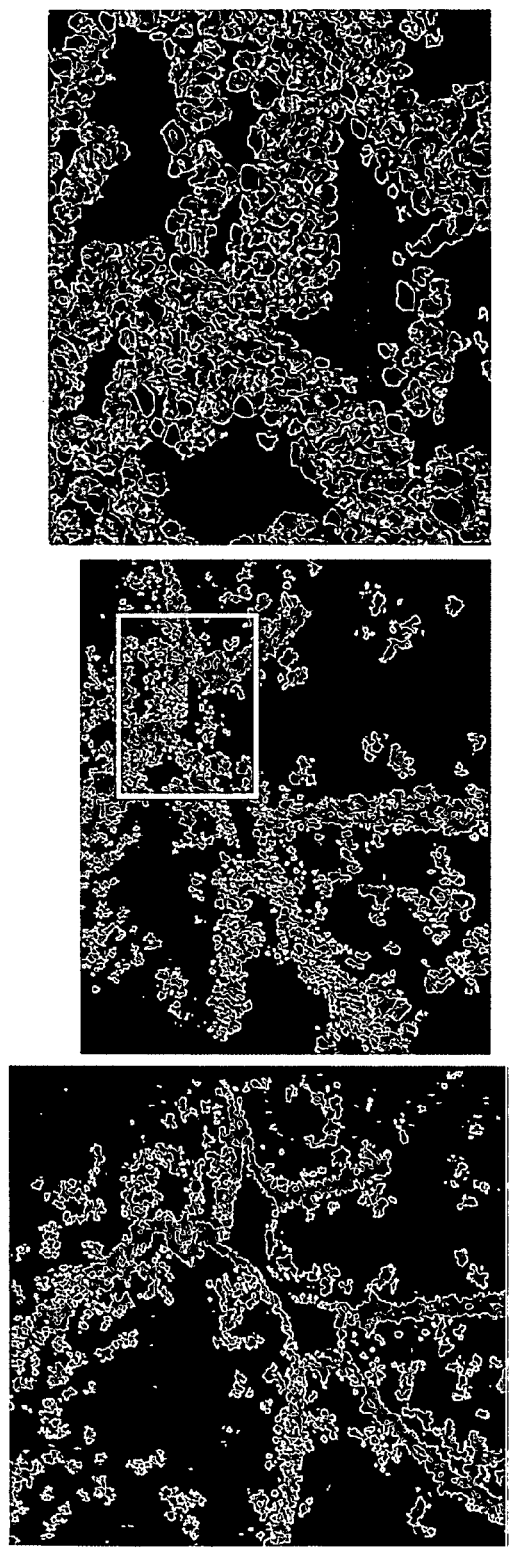
FIG. 1 shows the three-dimensional organization of nanoparticles forming sheets within 142 kg/mol polystyrene matrix. Images represent one part of the series of slices along the 100 nm section.

For example, when the matrix chains are shorter than the brush, we observe spherical aggregates when D<about 0.05 chains/nm$^2$, but when D>0.05 chains/nm$^2$, up to about 0.10 chains/nm$^2$, anisotropic sheet assembly is observed. However, when the matrix chains are longer than the brush, that is, M>$M_g$, the particles phase separate from the matrix, and organize into highly anisotropic string, sheet, or other ordered anisotropic 3-dimensional structures. TEM tomography results suggest that these sheets are a few (2-5) particles thick (see FIG. 1), but that their extent can be micrometers in the other two dimensions.

The self-assembled structure of nanoparticles are in the form of sheets with thickness of 2-5 nanoparticles. It is clearly seen that two sheets are stacked together (image on the left). The depth of the particles is determined by following the same structure in a series of consecutive slices and found as 1-10 μm and even longer. The image in the middle is the tilt view of the projection image. The image on the right shows the magnified image of the selected region.

Figure 3A:
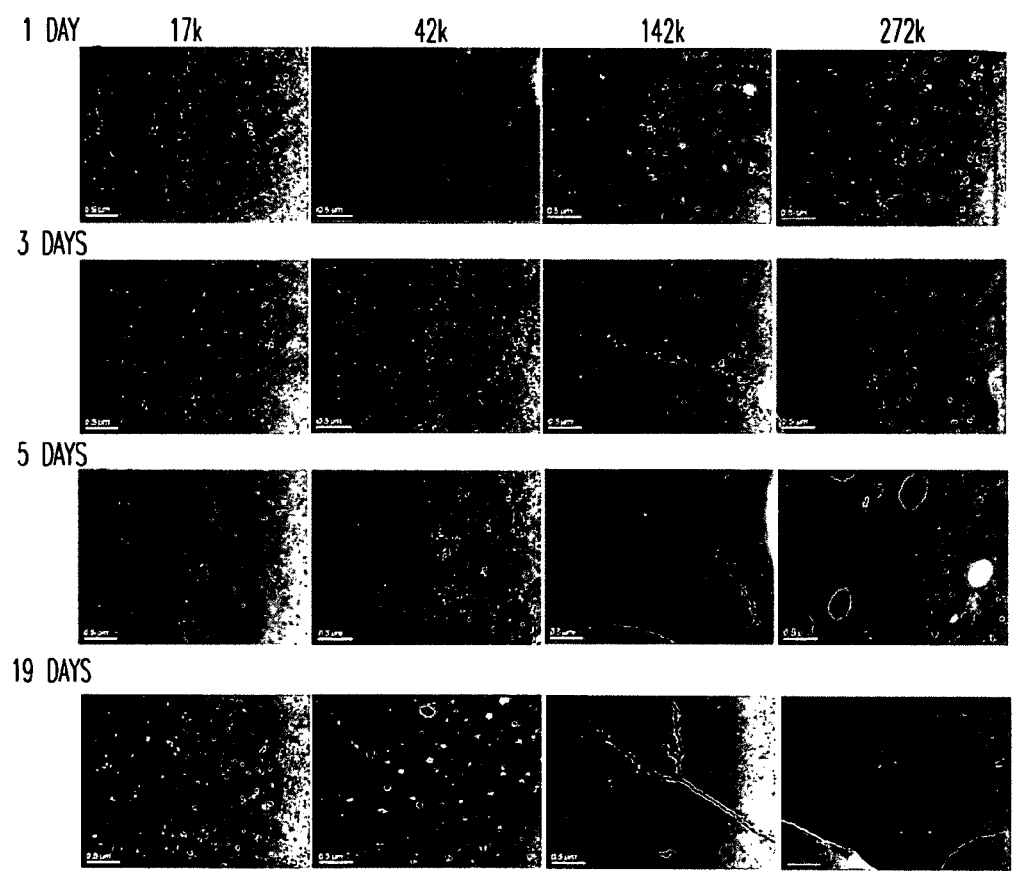
FIG. 3 shows: (A) TEM determined temporal evolution of particle structuring. In all cases 5 mass % silica grafted with a $M_g$=106 kDa polystyrene brush with 37 chains per particle (0.05 chains/$nm^2$), is mixed with polystyrene matrices of different M: 17, 42, 142 and 272 kDa, respectively, annealed at 150° C. for a range of times as noted in the figure. Sheet formation was observed in the composite with matrix M=142 kDa sample after 3 days of annealing and in the matrix M=272 kDa after 19 d. The scale bar in all cases is 0.5%μm, and the sections were cut normal to the film surface. (B) and (C) Effect of variations in grafting density and molecular weight of tethered chains ($M_g$) on particle dispersion and self-assembled structures after annealing for 5 d at 150° C.
Figure 3B:
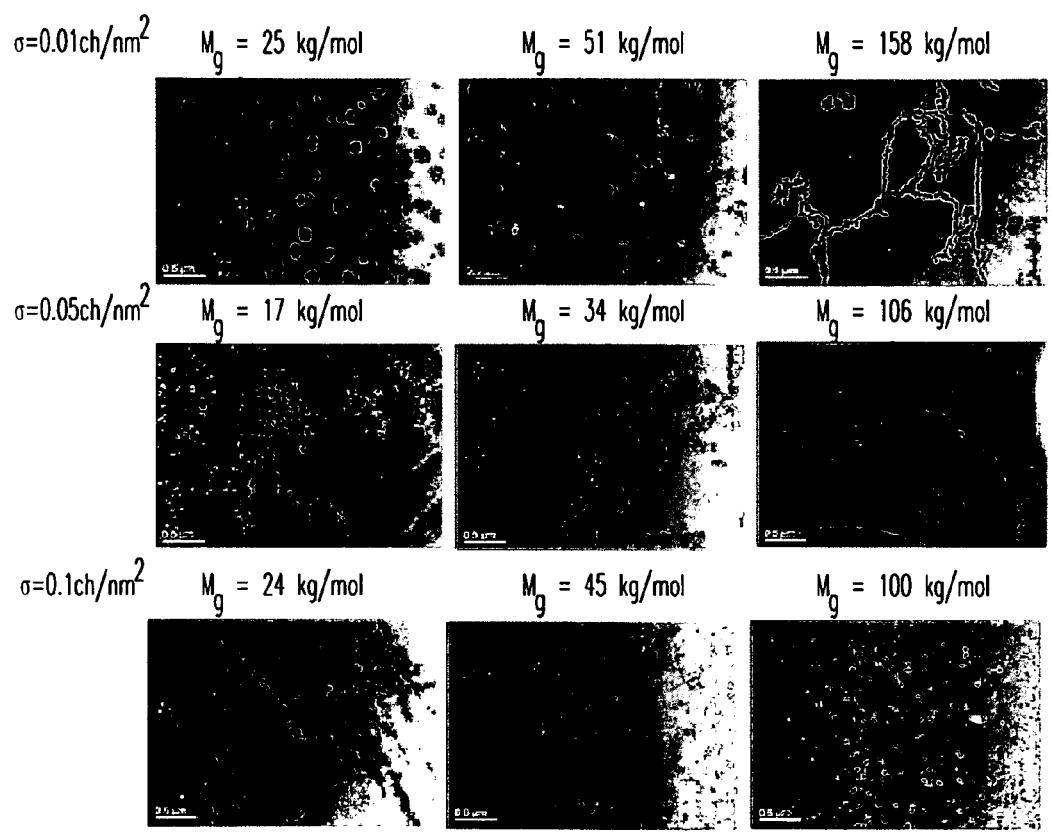
Figure 3C:
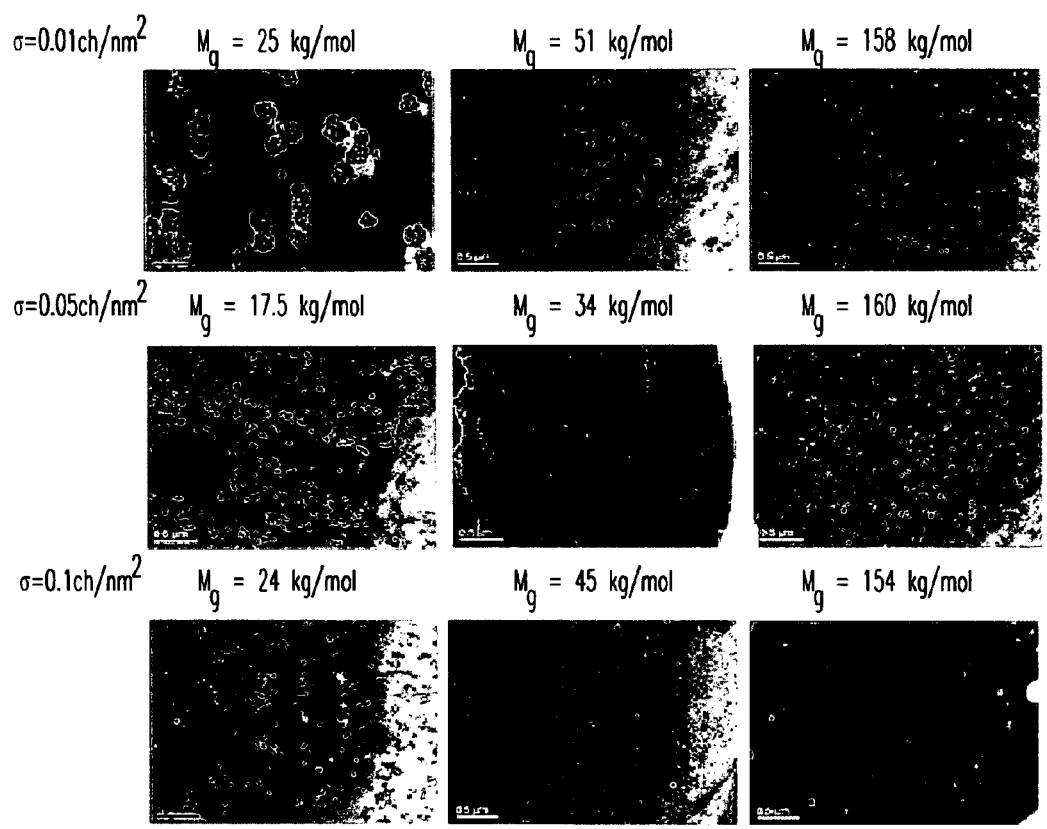

These dimensions are akin to those of certain types of clay sheets, which have been extensively used in polymer nanocomposites to achieve previously unprecedented improvements in mechanical properties, gas permeation and flame retardancy. The ability of the grafted nanoparticles to assemble into sheet-like and other anisotropic 3-dimensional morphologies allows for similar property improvements Bare, ungrafted silica nanoparticles do not show such anisotropic assembly in a polymeric matrix, but agglomerate into essentially spherical clusters. Spherical nanoparticles uniformly grafted with long polymer chains self-assemble into sheets and other three dimensional structures even though the interparticle interaction is expected to be isotropic. For example, 14 nm diameter silica particles grafted with brush structures composed of polystyrene (PS) chains of molecular weight 106 kg/mol, each particle having about 35 chains grafted to it (i.e., a chain grafting density D of 0.057 chains/nm$^2$), mixed with a variety of monodisperse polystyrene, the matrix polymer, with molecular weights 17k, 42k, 142k and 272k, respectively, in tetrahydrofuran solution with a core silica concentration was 5 wt %, exhibited anisotropic self-assembly when the matrix polymer had a molecular weight greater than the molecular weight of the PS chains, as can be seen in FIGS. 3A-C. When D is about 0.05 chains/nm2, and the matrix molecular weight M is greater than grafted molecule weight $M_g$, sheet self-assembly is observed.

We show that these superstructures are the result of competition between attractive forces within inorganic silica cores and the repulsion between the polymeric grafted chains. The balance between the two energies leads to the conformation of chains around the particles and yield various morphologies from strings to interconnected and to sheet-like structures. These results are estimated using the theoretical and simulation work discussed below.

Computational Modeling

To gain further theoretical insights into the amphiphile-like behavior of grafted nanoparticles we have used both mean-field theory and computer simulations. We simulated the self-assembly of particles uniformly grafted with polymer chains, each chain comprised of N monomers, in an implicit solvent using the Monte Carlo method. In our control study, we find that particles form spherical clusters when there are no grafted chains. This reflects the minimization of contact area between the particle-rich and the implicit solvent-rich phases formed by phase separation (FIG. 2A). The grafting of even six uniformly spaced dimers (N=2) yields assemblies with a flattened shape. Increasing the length of the grafted chains (to N=6) changes the form of self-assembly into hexagonal sheets, followed by one-dimensional strings for N=8. Eventually, for large enough N, we find sterically stabilized isolated particles (N=14). FIG. 2B then shows a composite "morphology" diagram obtained from the simulations. In addition to spherical aggregates and well dispersed particles, we see the formation of short strings, and sheet like structures with different particle packings. These results are complemented by the predictions of an analytical theory which has the following two essential ingredients. We assume that there is an extremely short ranged ("point") interparticle attraction. This is counteracted by the entropy of distorting the polymer brush chains when two particles approach each other. The minimization of the resulting free energy allows us to predict different nanoparticle morphologies (FIG. 2B). The fact that both the simulations and theory yield similar results suggests that the polymer grafted nanoparticle amphiphiles readily assemble into morphologies which balance core-core attractions and the elasticity of the grafted layer.

Experimental Study of Morphology:

Unfunctionalized silica particles agglomerate into large spherical structures (with diameters in the range 1-100 μm) when they are mixed with polystyrene. In our experimental study of this self-assembly we used about 14 nm diameter spherical silica particles grafted with polystyrene (PS) chains. Both the molecular mass ($M_g$) and the number of chains grafted on a particle were varied in a series of experiments (Table 1, Methods). The silica particles were mixed with monodisperse polystyrene as the matrix polymer (Table 2, Methods). All samples contained 5 mass % silica. Subsequently, each sample was annealed under vacuum at 150° C. (above the glass transition of polystyrene). The resulting time dependent assemblies were characterized by transmission electron microscopy (TEM), ultra small angle x-ray (US-AXS) and in a few cases by small angle neutron scattering.

FIG. 2C shows an experimentally-derived graphic "morphology diagram" of polymer tethered particles mixed with matrix polymers. The graph shows the relationship between the ratio of the matrix/grafted chain length (molecular weight ratio of matrix chains versus brush chains) and the average grafting density in chains per $nm^2$ on the surface of the inorganic cores of the nanoparticles, and the effect on the physical self-assembly that takes place in the particular situation. For example, at high grafting densities (0.10 chains per $nm^2$), dispersed nanoparticles with little or no anisotropic self-assembly is observed. At lower grafting densities (0.05 and 0.01 chains per $nm^2$), a variety of self-assembled morphologies are observed depending upon the ratio of graft (brush) to matrix chain length (molecular weight). Sheet or connected structure formation is observed when the matrix chain length exceeds the graft chain length, up to a ratio of about 4.5, where string formation predominates. When matrix chain length is less than graft chain length, isotropic spherical aggregates are observed.

TEM results are shown in FIGS. 3A-3C. FIG. 3A shows the temporal evolution of particle dispersion for a fixed brush molecular mass ($M_g$=106 kg/mol) and grafting density (37 chains/particle) within various molecular mass (M) polymer matrices over different periods of annealing time as indicated. It appears that nearly spatially uniform, isotropic, time-independent particle dispersion is achieved when the matrix M is smaller than $M_g$ (first and second columns). The particles can form short "strings", i.e., particle clusters that are typically only one particle wide, contain more than one particle but are finite in length, but substantially uniform dispersion in the matrix is typically observed. In contrast, composites with higher M matrices spontaneously self-assemble into highly anisotropic objects which typically fill the TEM field of view along at least one direction and are 2-10 particles wide. Two facts are noted about these anisotropic structures (the third and fourth columns in FIG. 3A). First, it is apparent that the kinetics of domain formation is slower with increasing matrix M. Second, at a given M, these objects grow with increasing annealing time, t. This rules out that the casting process might have created these structures. We have roughly characterized the domain growth kinetics and find that the characteristic sizes increase roughly as $t^{1/3}$. These images clearly show that the sizes of these large structures are kinetically controlled.

The TEM data in FIG. 3A-C were taken from slices normal to the surfaces. We have taken 15 adjacent approximately 100 nm thick slices from a film with a matrix of M=142 kg/mol, which show string-like morphologies in FIG. 3A, and find that the same "string-like" structure is seen in each slice (FIG. 5B). Consequently, these objects are sheet-like. We have also analyzed slices parallel to the casting surface and found qualitatively similar results. The particles spontaneously self-assemble into sheets which are 2 to 5 particles (<100 nm) wide with lateral dimensions in the 1 µm to 10 µm range. Only hexagonal particle packings in the sheets are observed.

Other graft densities and graft lengths were examined (FIGS. 3B and 3C). In all cases, the particles assemble into spheres at minimal polymer grafting. A variety of other superstructures form with increasing (grafted) polymer coverage on the particles, with the particles being well dispersed for large polymer coating layer thicknesses. In particular, we see the formation of interconnected structures (e.g., FIG. 3B, second row, first two samples), which clearly are not predicted by the theory/simulation. Since these structures occur in the parameter space between well dispersed particles and sheets, we conjecture that they are intermediate morphologies.

Figure 3D:
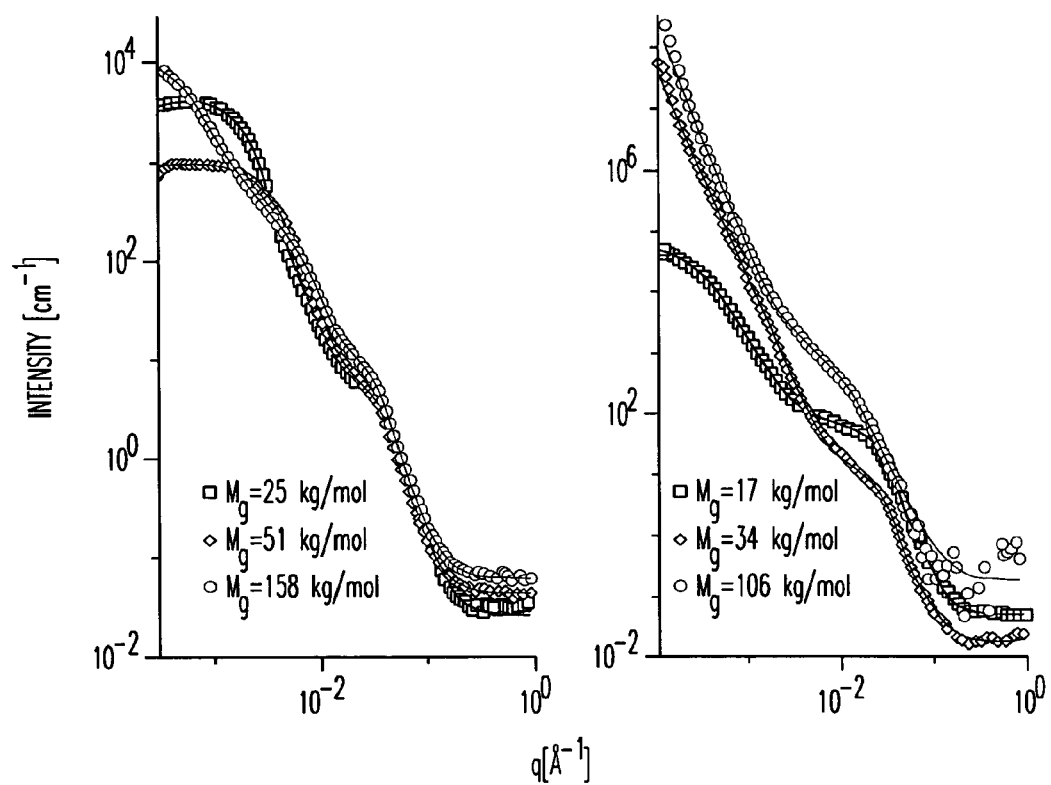

Next, ultra small angle x-ray scattering data (USAXS) were obtained, which serve to verify and complement the TEM measurements. FIG. 3D shows USAXS patterns for the samples whose TEM images are shown in the first two rows of FIG. 3B. In cases where the particles form compact clusters, we have found that the TEM and USAXS give consistent cluster size estimates. For example, the USAXS on the sample corresponding to the first TEM image in FIG. 3B, when fit using the unified model of Beaucage, suggests that there are scattering centers of two dominant length scales (see Table 3). Assuming the objects to be spherical, their average diameters are determined to be 12 and 225 nm, respectively. The first number is in reasonable agreement with TEM estimates of the nanoparticle diameter, 14±4 nm. However, the TEM images suggest that the particle aggregates (which presumably correspond to the larger USAXS derived scale) are circular objects with a diameter of 133±40 nm. We reconcile the USAXS and TEM by noting that the USAXS determined cluster sizes are larger than the typical thickness of a TEM slice (100 nm). Consequently, TEM will only sample slices of these clusters. A correction for this geometric factor, while still assuming spherical particle agglomerates, yields a TEM derived mean diameter of about 250 nm, in reasonable agreement with the USAXS. We now consider USAXS of sheet-like morphologies. In addition to the high q feature which refers to the particle size, we see a strong upturn in the q-low scattering intensity without any low q plateau. This is consistent with structures whose characteristic size s are larger than that can be measured by this technique (i.e., greater than about 1 µm). This is in agreement with TEM estimates of sheet size.

While some of the self-assembled structures appear to be time independent and hence well defined in size (such as the strings in the two left panels in FIG. 3A, and the sheets shown in FIG. 3C the bottom left panel), the predominant conclusion is that the domain sizes are time dependent (especially in the case of most of the sheet-like and interconnected structures). These superstructures, thus, are also polydisperse. These conclusions have clear parallels to the behavior of conventional surfactants which can form highly monodisperse spheres, but can also result in highly polydisperse worm-like micelles under different conditions. Each of the results shown in FIGS. 3A-3C was repeated on several independently prepared samples (using two batches of particles which were separately functionalized with the grafted chains).

Consequences of Self-Assembly on Properties:

To delineate the practical usefulness of particle self-assembly we have measured the linear and non-linear rheology of these nanocomposites following ideas presented in. Initially, we select two samples corresponding to the images in FIG. 3A where the particles are grafted with 37 chains each of $M_g$=106 kg/mol: one sample has well dispersed short particle strings (matrix M=42 kg/mol) while the other has large self-assembled particle sheets (matrix M=142 kg/mol). The linear rheology data suggest that only the latter sample yields solid-like behavior at low frequencies. Consistent with this notion, we find a maximum in a time dependent plot of shear stress when a constant steady shear rate is applied (start-up of steady shear, FIG. 4). Apparently, the solid-like nature of this system, which we presume to be caused by the self-assembled sheets of particles, is altered under the application of steady shear and produces the yield-like phenomenon. TEM microscopy results show that the connected structures orient and "coarsen" after the application of large amplitude strain. No such shear maximum is observed in the low molecular weight sample where the particles do not form large structures (FIG. 4). Similarly, since we observe no such stress maxima in the pure 142 kg/mol homopolymer sample (FIG. 4), we suggest that the reinforcement observed is due primarily to particle self-assembly into large objects. The results obtained from another sample comprised of percolating particle sheets (shown in FIG. 3B the first row, extreme right) are more surprising. FIG. 4 shows that, while sample yields significant reinforcement there is no stress dropoff with increasing strain; apparently the underlying particle structures are not "broken" over the ranges of strain applied. In this last case we conjecture that, due to a decrease in the number of grafted chains, there is an increased propensity of the attractive core-core contacts. This then yields more persistent particle clusters which do not "break" easily. Our ability to control the interparticle attraction through the use of grafted polymer provides us with the unique ability to create polymeric materials with tunable mechanical properties.

Figure 5A:
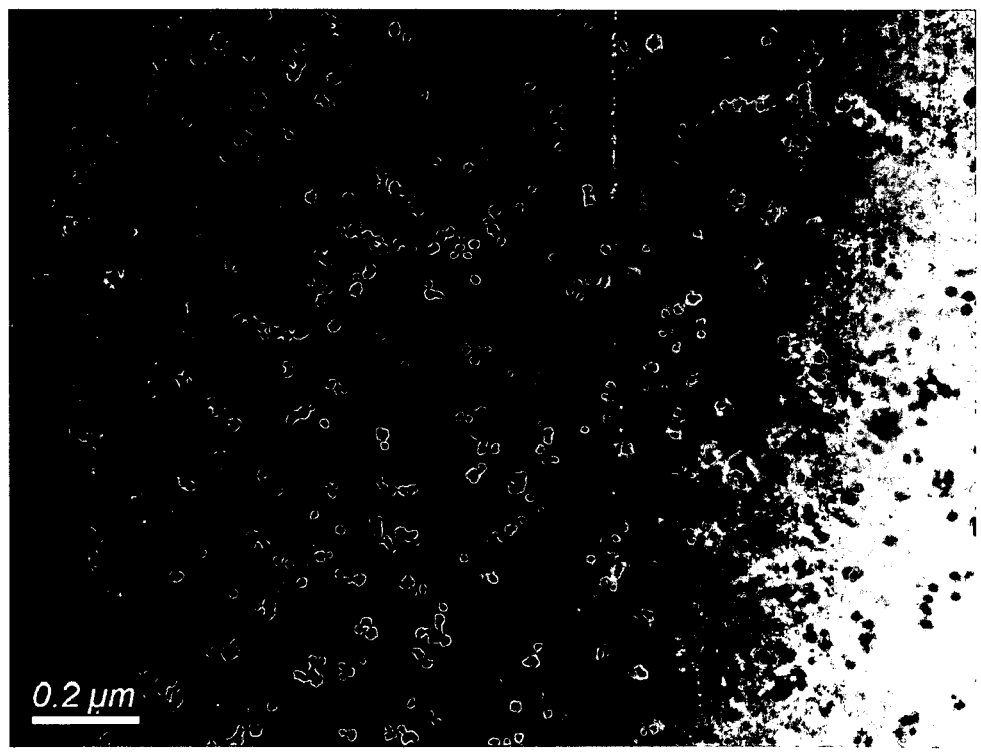
Figure 5B:
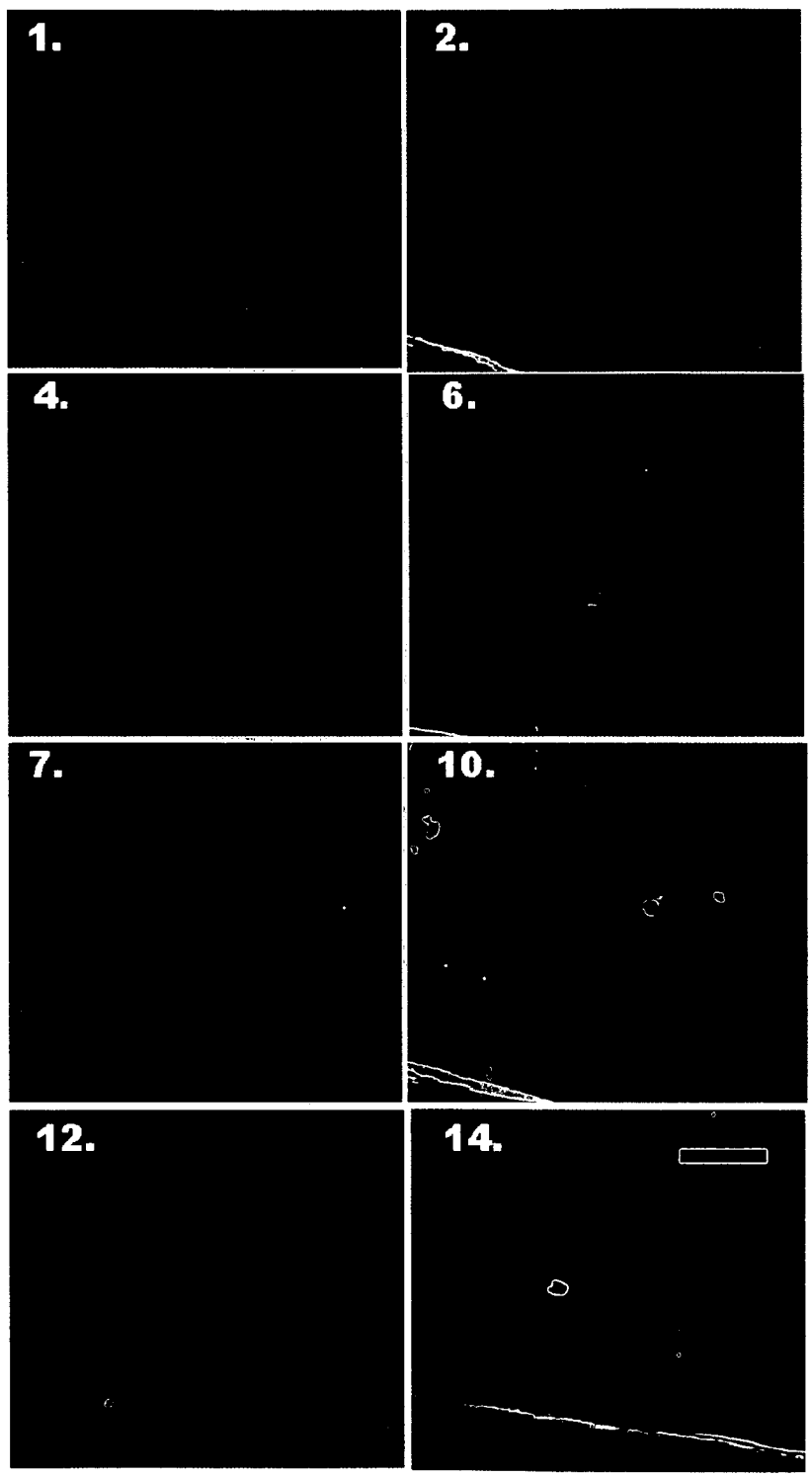

FIG. 5A shows a detailed TEM of 5 mass % silica grafted with a 106 kDa polystyrene brush, with polystyrene matrix of M=17 kDa annealed for 5 d. It is readily apparent that the particles form short strings. Here, the graft polymeric chains are longer than the matrix polymeric chains.

In contrast, FIG. 5B shows TEM micrographs of the blend of 5 mass % silica grafted with a 106 kDa PS in a 142 kDa PS homopolymer annealed for 5 days from consecutive sections. Here, the graft polymeric chains are shorter than the matrix polymeric chains. These sheets were found to be at least as large as 1.4 μM in lateral dimensions.

Figure 5C:
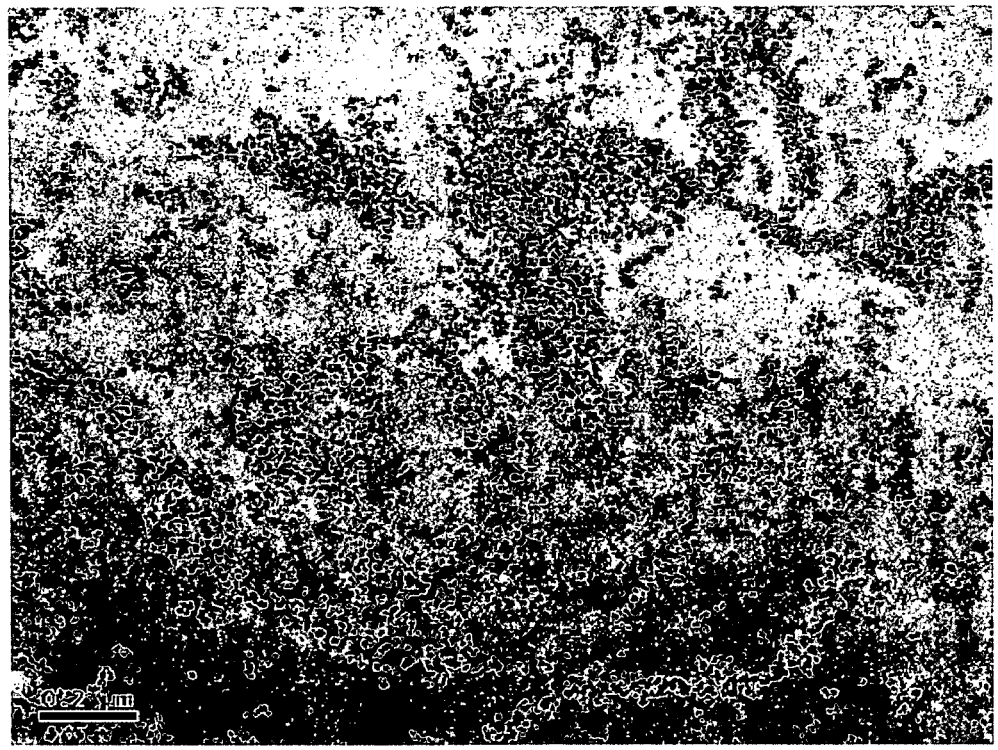

FIG. 5C shows a higher magnification TEM micrograph of the composite with the 142 kDa matrix of FIG. 5B annealed for 5 days. The scale bar is 0.2 μm.

For example, materials of the invention or materials produced by a method of the invention can be used in the preparation of synthetic biological materials such as bone and tooth enamel. The superior mechanical properties that can be obtained with the inventive materials will provide materials suitable for bone or tooth repair in patients where the resulting structure is stronger and more durable.

In another example, materials of the invention or materials produced by a method of the invention can be used in the construction of fuel cells where the superior structural properties and the high ion densities that can be achieved result in more efficient fuel cells.

These self-assembled structures can be used as flame retardant materials as the anisotropic structures will reduce the gas permeability. The structures can be used for electroconductive material if the conductive particles (e.g. barium strontium titanate) are chosen in the synthesis of polymer coated particles.

EXAMPLES

Silica particles of 14±4 nm in diameter from Nissan Chemicals were grafted with polystyrene chains by radical addition fragmentation transfer polymerization (RAFT) technique. Particles were grafted with polystyrene chains of molecular weights of 115 kg/mol and 106 kg/mol. The grafting densities were measured using thermal gravimetric analyzer and elemental analysis. Matrix homopolymers were purchased from Polymer Laboratories. Polydispersity indices of the matrix and tethered polymers are listed in Tables 1 and 2. Particles in solution were sonicated for 15 seconds and then mixed with the matrix polystyrene homopolymers by sonicating for another 2 minutes. The composites were then solution cast onto glass petri dishes, dried to remove the solvent and then annealed for varying times (1-19 days) in a vacuum oven at 150° C. Particle concentration was 5 wt % in all samples. Samples were embedded in epoxy resin and the blocks were microtomed using Leica UCT microtome with a thickness of 100 nm. The single slot grids (2×1 mm slot size) which were coated with a formvar membrane were used for the analysis of structures through consecutive sections. The sections were microtomed both normal and parallel to the sample surface. Pure brush sample was prepared for imaging by placing a drop of dilute particle solution (in benzene) on a grid that is followed by quick evaporation and imaging. The resulting particle morphology was examined using JEM-100 CX transmission electron microscopy (TEM). We have conducted TEM tomography using Tecnai F20 (200 kV FEG) electron microscope at the New York Structural Biology Center.

TABLE 1

Matrix molecular weights (M) and homopolymer polydispersities (PDI) used in the preparation of nanocomposites.
PS matrix homopolymers

| M (kg/mol) | PDI |
|---|---|
| 17 | 1.04 |
| 42 | 1.08 |
| 142 | 1.06 |
| 272 | 1.08 |

TABLE 2

Brush molecular weights ($M_g$), polydispersities (PDI) and grafting densities ($\sigma$) of polymers grafted on silica particles.
PS-grafted-Silica
Grafting density ($\sigma$)

| $\sigma = 0.01$ (chains/nm$^2$) | | $\sigma = 0.05$ (chains/nm$^2$) | | $\sigma = 0.1$ (chains/nm$^2$) | |
|---|---|---|---|---|---|
| $M_g$ (kg/mol) | PDI | $M_g$ (kg/mol) | PDI | $M_g$ kg(mol) | PDI |
| 25 | 1.20 | 17 | 1.05 | 24 | 1.04 |
| 51 | 1.20 | 34 | 1.05 | 45 | 1.06 |
| 115 | 1.28 | 106 | 1.07 | 100 | 1.10 |
| 158 | 1.50 | 160 | 1.21 | 154 | 1.25 |

Processing the Nanocomposites: Particles in solution (either benzene or tetrahydrofuran) were sonicated for 15 s and then mixed with the matrix polystyrene homopolymers. This was followed by sonication for another 2 min. The particle concentration was 5 mass % in all the dried samples. The composites, in solution, were cast onto glass petri dishes, dried to remove the solvent and then annealed for varying times (1 d. to 19 d.) in a vacuum oven under a pressure of $10^{-4}$ torr at 150° C. The resulting samples were characterized by TEM, USAXS, rheology and SANS.

TEM Analysis of Particle Morphology:

Annealed samples were embedded in an epoxy resin and the resulting sample blocks were microtomed using a Leica UCT microtome to yield samples of approximately 100 nm thickness. Single slot grids (2×1 mm slot size), which were coated with a formvar membrane, were used for the analysis of structures through consecutive sections. The sections were microtomed both normal and parallel to the sample surface. The resulting particle morphology was examined using a JEM-100 CX transmission electron microscope (TEM). We have also conducted TEM tomography using a Tecnai F20

(200 kV FEG) electron microscope at the New York Structural Biology Center. Microtomed samples were carbon coated to provide stability against the 200 kV electron bombardment.

USAXS Characterization of Particle Morphology:

Ultra-small angle x-ray scattering patterns were measured at the Advanced Photon Source at the 32ID-B beamline using a Bonse-Hart camera. Samples were approximately 2 mm in diameter. Since the thicknesses varied from sample to sample (and sometimes within each sample, due to limitations in sample amounts), we do report scattering intensity in absolute units. The data were fit to the Beaucage unified equation:

$$I(q) = \sum_i A_i \exp[-q^2 R_{gi}^2/3] + B_i \left[ \mathrm{erf}\left(\frac{qR_{gi}}{\sqrt{3}}\right) \right]^{pi}$$

where q is the wavevector, and we assume several levels of structure (typically 2 or 3) to fit the data. See Beaucage, G., Approximations leading to a unified exponential power-law approach to small-angle scattering. *J Appl Crystallogr* 28, 717 (1995). When one assumes that the objects are spherical we can derive their radius from the relationship:

$$R_g^2 = \frac{3}{5} R^2.$$

The results obtained by fitting the data from the samples shown in the first two rows of FIG. 3B are presented in Table 3. The USAXS gives the size of the primary particles, and also indicates the existence of larger scale mass fractal structures (with fractal dimension~3). It is unclear why the particle sizes vary in the last three rows, while they remain relatively constant for the first three rows. We conjecture that this might represent local particle clustering. USAXS does not provide the dimensions of the large scale clusters seen in the second row of FIG. 3B (samples with brush molecular mass of 34 and 106 kg/mol. respectively). This indicates that the cluster sizes are larger than $\approx 1$ μm.

TABLE 3

Primary particle and cluster sizes obtained from Beaucage unified fits to the USAXS data at different q regions for data shown in FIG. 3D.

| $^2$Brush $M_g$ (kg/mol) | High q-Primary particle $R_g$ (Å) | Low q-Cluster $R_g$ (Å) | Intermediate q $R_g$ (Å) | Low q-Power law exponent |
|---|---|---|---|---|
| 25 | 45 | 869 | | 3.6 |
| 51 | 53 | 847 | | 4.0 |
| 158 | 56 | 6034 | 499 | 3.1 |
| 17 | 150 | 7150 | | 3.6 |
| 34 | 139 | | | 3.5 |
| 106 | 227 | | | 3.6 |

Eliminating Other Artifacts:

At this juncture it is important to rule out other obvious experimental artifacts. First, in previous work, we have determined that the level of sonication used to facilitate dispersion in solution causes very little changes in the molecular weights of the polymers. For a polystyrene of 92 kg/mol we found that sonication for 2 min reduced the molecular mass to 90 kg/mol. We have also conducted dynamic light scattering of polymer grafted particle suspensions in benzene (0.256 mg/ml) after various sonication times (up to 6 min). We find that there is no measurable change in the hydrodynamic radii of the particles especially up to 2 min, which is the maximum time to which we subject our samples to sonication ($R_h$ is 53 nm at 0 min, 50 nm at 1 min and 54 nm at 2 min). We also rule out spatial anisotropies in the grafting of the polymer chains to the particles. Casting a drop of tetrahydrofuran solution containing only the PS brush-grafted nanoparticles onto a TEM grid and then evaporating the solvent showed no indication of any "string-like" or compact "dot-like" structures; rather, the particles appear to order into quasi-hexatic structures in spite of the relatively significant polydispersity in bare particle sizes (14±4 nm). Electrophoretic mobility measurements show that the functionalized particles carry no measurable charge, and hence there are essentially no long-ranged charge effects. We also rule out brush scission during the long annealings to which these nanocomposites are subject by redissolving the nanocomposites in solvent and gel permeation chromatography analysis, which showed no peak corresponding to grafted chains detached from the surface.

SANS for Characterization of Polymer Chains:

Samples of particles grafted with a hydrogenated brush of $M_g$=130 kg/mol with 37 chains per particle on average, were mixed with deuterated matrices. Both the amount of silica and the M of the matrix were varied in a series of experiments. As the neutron scattering length density of silica ($2 \times 10^{10}$ cm$^{-2}$) is relatively close to the hydrogenated PS ($1.5 \times 10^{10}$ cm$^{-2}$), SANS essentially measures the size of the particle with the brush chains on them. Unfortunately due to the different contrasts in the system it is hard to unequivocally determine the size of the brush chains: the experiments reported here are thus only qualitatively indicative of brush dimensions. We have fit our SANS data, obtained at NCNR at NIST, Gaithersburg, Md., to the Beaucage model with two levels of structure as discussed above for the USAXS data analysis. The results indicate that $R_g$ decreases when the matrix molecular weight is increased, while keeping the other parameters the same (e.g. grafting density at 0.26 chains/nm$^2$, brush chain length at $M_g$=130 kg/mol and particle loading at 15 mass %) (Table 4). These preliminary results support the idea of brush being "wet" when they are mixed with the lower molecular weight matrix, but "dewet" (followed by brush compression) for large M matrices.

TABLE 4

Nanobrush size within wetting and dewetting matrices measured using SANS.

| $M_g$ brush (kg/mol) | M matrix (kg/mol) | Mass % Silica | $R_g$ (particle + brush) (Å) |
|---|---|---|---|
| 130 | 90 | 15 | 169 |
| 130 | 200 | 15 | 119 |

Simulation

Monte Carlo simulations are performed on a system consisting of 100 nanoparticles with uniformly grafted polymer chains in an implicit solvent. The polymer chains are modeled as bead necklace chains with the bead diameter of σ, with bond lengths in the range of 1.02-1.1σ, while a nanoparticle is a sphere of diameter, D=7.5σ. A square well potential is used to represent the interaction between two nanoparticles, $$u(r) = \begin{cases} \infty & r < D \\ -\varepsilon & D \le r < \lambda D \\ 0 & r \ge \lambda D \end{cases}$$

where $\epsilon$ is the attractive well depth, $\lambda$ (=1.1) is the attraction range. Monomer-monomer and nanoparticle-monomer interactions are modeled by hard sphere potentials. Canonical ensemble (NVT) simulations are carried out using the Metropolis algorithm. The number density fraction of the (bare) nanoparticles is 0.001. The simulation box is a cube with periodic conditions. Five types of MC moves attempted with a probability (0.3:0.1:0.4:0.1:0.1) are translations and rotations of grafting nanoparticles, translations of monomers and translations and rotations of the cluster of grafting nanoparticles, respectively. The simulation temperature is $T^* = k_B T/\epsilon = 0.1$. Each simulation is at least 10 million MC steps of equilibration followed by 100 million MC steps (production). We investigated a series of systems with the chain length of the polymer varying from 0 to 16. Five independent runs were performed for each case. With increasing length of the grafted chains we find that the particle assemblies go from spheres to flattened cylinders, branched cylinders, and sheets; we believe that these structures correspond to the self-assembly of phase separated nanoparticles. In sheet like structures we see that the particle packings are either tetragonal or two-dimensional hexagonal rings, as also observed in the experiments. We report the sheets in these two categories, which denote local particle packings. For even longer chains the particles no longer phase separate from the solvent: rather they self-assemble into linear chains. Beyond this, the particles are miscible in the solvent.

RELATED DOCUMENTS

Bansal, A. et al. Quantitative equivalence between polymer nanocomposites and thin polymer films. *Nature Materials* 4, 693-698 (2005).

Bansal, A. et al. Controlling the thermornechanical properties of polymer nanocomposites by tailoring the polymer-particle interface. *Journal of Polymer Science Part B-Polymer Physics* 44, 2944-2950 (2006).

Bates, F. S. & Fredrickson, G. H. Block copolymers—Designer soft materials. *Physics Today* 52, 32-38 (1999).

Beaucage, G. Approximations leading to a unified exponential power-law approach to small-angle scattering. *Journal of Applied Crystallography* 28, 717-728 (1995).

Bedrov, D.; Smith, G. D.; Li, L. W., Molecular dynamics simulation study of the role of evenly spaced poly(ethylene oxide) tethers on the aggregation of C-60 fullerenes in water. *Langmuir* 21, (12), 5251-5255, (2005).

Belkin, M., Snezhko, A., Aranson, I. S. & Kwok, W. K. Driven magnetic particles on a fluid surface: Pattern assisted surface flows. *Physical Review Letters* 99 (2007).

Dinsmore, A. D., Prasad, V., Wong, I. Y. & Weitz, D. A. Microscopic structure and elasticity of weakly aggregated colloidal gels. *Physical Review Letters* 96, (2006).

Fejer, S. N.; Wales, D. J., Helix self-assembly from anisotropic molecules. *Physical Review Letters* 99, (8), 086106, (2007).

Ghezelbash, A.; Koo, B.; Korgel, B. A., Self-assembled stripe patterns of CdS nanorods. *Nano Letters* 6, (8), 1832-1836, (2006).

Glaser, M. A.; Grason, G. M.; Kamien, R. D.; Kosmrlj, A.; Santangelo, C. D.; Ziherl, P., Soft spheres make more mesophases. *EPL* 78, (4), 46004, (2007).

Glotzer, S. C. & Solomon, M. J. Anisotropy of building blocks and their assembly into complex structures. *Nature Materials* 6, 557-562 (2007).

Green, D. L. & Mewis, J. Connecting the wetting and rheological behaviors of poly(dimethylsiloxane)-grafted silica spheres in poly(dimethylsiloxane) melts. *Langmuir* 22, 9546-9553 (2006).

Gupta, S., Zhang, Q. L., Emrick, T., Balazs, A. C. & Russell, T. P. Entropy-driven segregation of nanoparticles to cracks in multilayered composite polymer structures. *Nature Materials* 5, 229-233 (2006).

Goel, V. et al. Viscoelastic properties of silica-grafted poly (styrene-acrylonitrile) nanocomposites. *Journal of Polymer Science Part B—Polymer Physics* 44, 2014-2023 (2006).

Harton, S. E. & Kumar, S. K. Mean-field theoretical analysis of brush-coated nanoparticle dispersion in polymer matrices. *Journal of Polymer Science Part B-Polymer Physics* 46, 351-358 (2008).

Hooper, J. B., Bedrov, D. & Smith, G. D. Supramolecular self-organization in PEO-modified C-60 fullerene/water solutions: Influence of polymer Molecular weight and nanoparticle concentration. *Langmuir* 24, 4550-4557 (2008).

Ilaysky, J., Allen, A. J., Long, G. G. & Jemian, P. R. Effective pinhole-collimated ultrasmall-angle x-ray scattering instrument for measuring anisotropic microstructures. *Review of Scientific Instruments* 73, 1660-1662 (2002).

Kashiwagi, T. et al. Nanoparticle networks reduce the flammability of polymer nanocomposites. *Nature Materials* 4, 928-933 (2005).

Kashiwagi, T. et al. Relationship between dispersion metric and properties of PMMA/SWNT nanocomposites. *Polymer* 48, 4855-4866 (2007).

Kausch, H. H. & Michler, G. H. Effect of nanoparticle size and size-distribution on mechanical behavior of filled amorphous thermoplastic polymers. *Journal of Applied Polymer Science* 105, 2577-2587 (2007).

Kluppel, M. Structure and properties of fractal filler networks in rubber. *Kautschuk Gummi Kunststoffe* 50, 282-291 (1997).

Krishnamoorti, R. & Vaia, R. A. Polymer nanocomposites. *Journal of Polymer Science Part B-Polymer Physics* 45, 3252-3256 (2007).

Krishnamoorti, R. Strategies for dispersing nanoparticles in polymers. *Mrs Bulletin* 32, 341-347 (2007).

Kumar, S. K. & Douglas, J. F. Gelation in physically associating polymer solutions. *Physical Review Letters* 8718 (2001).

Lee, J. Y., Balazs, A. C., Thompson, R. B. & Hill, R. M. Self-assembly of amphiphilic nanoparticle-coil "tadpole" macromolecules. *Macromolecules* 37, 3536-3539 (2004).

Li, C., Han, J., Ryu, C. Y. & Benicewicz, B. C. A versatile method to prepare RAFT agent anchored substrates and the preparation of PMMA grafted nanoparticles. *Macromolecules* 39, 3175-3183 (2006).

Ma, C. C. M., Chen, Y. J. & Kuan, H. C. Polystyrene nanocomposite materials: Preparation, morphology, and mechanical, electrical, and thermal properties. *Journal of Applied Polymer Science* 98, 2266-2273 (2005).

Mackay, M. E. et al. General strategies for nanoparticle dispersion. *Science* 311, 1740-1743 (2006).

Malescio, G.; Pellicane, G., Stripe phases from isotropic repulsive interactions. *Nature Materials* 2, (2), 97-100, (2003).

Mladek, B. M.; Gottwald, D.; Kahl, G.; Neumann, M.; Likos, C. N., Formation of polymorphic cluster phases for a class of models of purely repulsive soft spheres. *Physical Review Letters* 96, (4), 045701, (2006).

Payne, A. R. Effect of dispersion on dynamic properties of filler-loaded rubbers *Journal of Applied Polymer Science* 9, 2273-& (1965).

Putt, K., Krishnamoorti, R. & Green, P. F. The role of interfacial interactions in the dynamic mechanical response of functionalized SWNT-PS nanocomposites. *Polymer* 48, 3540-3545 (2007).

Qi, H.; Hegmann, T., Formation of periodic stripe patterns in nematic liquid crystals doped with functionalized gold nanoparticles. *Journal of Materials Chemistry* 16, (43), 4197-4205. (2006).

Qin, Y.; Fichthorn, K. A., Solvophobic solvation forces between colloidal nanoparticles: Directed alignment. *Physical Review E* 73, (2), 020401R, (2006).

Rabani, E., Reichman, D. R., Geissler, P. L. & Brus, L. E. Drying-mediated self-assembly of nanoparticles. *Nature* 426, 271-274 (2003).

Ravi, P.; Dai, S.; Hong, K. M.; Tam, K. C.; Gan, L. H., Self-assembly of C-60 containing poly(methyl methacrylate) in ethyl acetate/decalin mixtures solvent. *Polymer* 46, (13), 4714-4721, (2005).

Sawadaishi, T.; Ijiro, K.; Shimomura, M.; Shiraishi, Y.; Toshima, N.; Yonezawa, T.; Kunitake, T., Two-dimensional patterning of nanoparticles using dissipative structures. *Molecular Crystals and Liquid Crystals* 371, 123-126, (2001).

Sciortino, F., Mossa, S., Zaccarelli, E. & Tartaglia, P. Equilibrium cluster phases and low-density arrested disordered states: The role of short-range attraction and long-range repulsion. *Physical Review Letters* 93, (2004).

Sciortino, F., Bianchi, E., Douglas, J. F. & Tartaglia, P. Self-assembly of patchy particles into polymer chains: A parameter-free comparison between Wertheim theory and Monte Carlo simulation. *Journal of Chemical Physics* 126, (2007).

Sear, R. P.; Chung, S. W.; Markovich, G.; Gelbart, W. M.; Heath, J. R., Spontaneous patterning of quantum dots at the air-water interface. *Physical Review E* 1999, 59, (6), R6255-R6258;

Seul, M. & Andelman, D. Domain Shapes and Patterns—the Phenomenology of Modulated Phases. *Science* 267, 476-483 (1995).

Shay, J. S., Raghavan, S. R. & Khan, S. A. Thermoreversible gelation in aqueous dispersions of colloidal particles bearing grafted poly(ethylene oxide) chains. *Journal of Rheology* 45, 913-927 (2001).

Solomon, M. J., Almusallam, A. S., Seefeldt, K. F., Somwangthanaroj, A. & Varadan, P. Rheology of polypropylene/clay hybrid materials. *Macromolecules* 34, 1864-1872 (2001).

Starr, F. W., Douglas, J. F. & Glotzer, S. C. Origin of particle clustering in a simulated polymer nanocomposite and its impact on rheology. *Journal of Chemical Physics* 119, 1777-1788 (2003).

Tang, Z. Y., Zhang, Z. L., Wang, Y., Glotzer, S. C. & Kotov, N. A. Self-assembly of CdTe nanocrystals into free-floating sheets. *Science* 314, 274-278 (2006).

Van Workum, K. & Douglas, J. F. Symmetry, equivalence, and molecular self-assembly. *Physical Review E* 73, 031502 (2006).

Warrick, E. L. Rheology of Filled Siloxane Polymers. *Industrial and Engineering Chemistry* 47, 1816-1820 (1955).

Wu, C. K., Hultman, K. L., O'Brien, S. & Koberstein, J. T. Functional oligomers for the control and fixation of spatial organization in nanoparticle assemblies. *Journal of the American Chemical Society* 130, 3516-3520 (2008).

While the invention has been described and exemplified in sufficient detail for those skilled in this art to make and use it, various alternatives, modifications, and improvements will be apparent to those skilled in the art without departing from the spirit and scope of the claims. The features of the disclosed embodiments can be combined, rearranged, etc. within the scope of the invention to provide further embodiments. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. An anisotropic self-assembled structure comprising: a plurality of substantially isotropic grafted nanoparticles in a polymeric matrix, the anisotropic self-assembled structure comprising
    (a) a one-dimensional string of the grafted nanoparticles within the polymeric matrix, the string having a width of one nanoparticle and a length of 2-10 nanoparticles,
    (b) a substantially two-dimensional sheet of the grafted nanoparticles within the polymeric matrix, the sheet having a length and a breadth of at least one micron respectively, wherein the sheet is about 2-5 nanoparticles in thickness, or
    (c) a plurality of three dimensionally interconnected structures where the width of each of the three dimensionally interconnected structures is 1-10 nanoparticles;
    wherein each grafted nanoparticle comprises a substantially spherical inorganic core nanoparticle and an organic brush structure grafted thereto, the organic brush structure and the polymeric matrix being molecules not covalently attached to one another, the organic brush structure and the polymeric matrix independently comprising a polymer, the polymer having the same chemical structure in the polymeric matrix as in the organic brush structure but with a different length, and wherein
    the brush structure comprises a plurality of grafted polymeric chains of a weight average molecular weight $M_g$,
    the polymeric matrix has a weight average molecular weight of M that is greater than about 120 kDa, wherein $M_g/M$ is equal to or less than 7, and
    there is an average number of grafted polymeric chains per nm$^2$ of surface of the inorganic core nanoparticles D, wherein 0.01 chains/nm$^2$<D<0.1 chains/nm$^2$.

2. The anisotropic self-assembled structure of claim 1 wherein $M_g/M$<1 and 0.05 chains/nm$^2$<D<0.10 chains/nm$^2$, wherein the anisotropic self-assembled structure comprises (b) a substantially two-dimensional sheet of the grafted nanoparticles within the polymeric matrix, the sheet having a length and a breadth of at least one micron respectively, wherein the sheet is about 2-5 nanoparticles in thickness, or (c) a plurality of three dimensionally interconnected structures where the width of each of the three dimensionally interconnected structures is 1-10 nanoparticles.

3. The anisotropic self-assembled structure of claim 1 wherein 1<$M_g$/M<about 3 and 0.01 chains/nm$^2$<D<about 0.10 chains/nm$^2$, wherein the self-assembled structure comprises
   (a) a one-dimensional string of the grafted nanoparticles within the polymeric matrix, the string having a width of one nanoparticle and a length of 2-10 nanoparticles,
   (b) a substantially two-dimensional sheet of the grafted nanoparticles within the polymeric matrix, the sheet having a length and a breadth of at least one micron respectively, wherein the sheet is about 2-5 nanoparticles in thickness, or
   (c) a plurality of three dimensionally interconnected structures where the width of each of the three dimensionally interconnected structures is 1-10 nanoparticles.

4. The anisotropic self-assembled structure of claim 1 wherein about 3<$M_g$/M<about 7 and 0.01 chains/nm$^2$<D<about 0.05 chains/nm$^2$, wherein the self assembled structure comprises
   (a) a one-dimensional string of the grafted nanoparticles within the polymeric matrix, the string having a width of one nanoparticle and a length of 2-10 nanoparticles,
   (b) a substantially two-dimensional sheet of the grafted nanoparticles within the polymeric matrix, the sheet having a length and a breadth of at least one micron respectively, wherein the sheet is about 2-5 nanoparticles in thickness, or
   (c) a plurality of three dimensionally interconnected structures where the width of each of the three dimensionally interconnected structures is 1-10 nanoparticles.

5. The anisotropic self-assembled structure of claim 1 wherein substantially all of the plurality of grafted nanoparticles have a respective inorganic core comprising silica.

6. The anisotropic self-assembled structure of claim 1 wherein substantially all of the plurality of grafted nanoparticles comprises nanoparticles wherein the inorganic core has an average particle diameter of about 14±4 nm.

7. The anisotropic self-assembled structure of claim 1 wherein the brush structure comprises polystyrene and $M_g$ is about 100-120 kDa, or the brush structure comprises poly(methylmethacrylate) and $M_g$ is about 85 kDa.

8. The anisotropic self-assembled structure of claim 1 wherein the brush structure comprises polystyrene chains.

9. The anisotropic self-assembled structure of claim 1 wherein there are about 25-45 grafted polymeric organic chains per nanoparticle.

10. The anisotropic self-assembled structure of claim 1 wherein the polymeric matrix comprises polystyrene or polymethylmethacrylate.

11. The anisotropic self-assembled structure of claim 1 wherein the polymeric matrix comprises polystyrene having a weight average molecular weight of greater than about 120 kDa.

12. The anisotropic self-assembled structure of claim 1 wherein the polymeric matrix comprises poly(methylmethacrylate) having a weight average molecular weight of greater than about 180 kDa.

13. The anisotropic self-assembled structure of claim 1 comprising a one-dimensional string of the grafted nanoparticles within the polymeric matrix, the string having a width of one nanoparticle and a length of 2-10 nanoparticles.

14. The anisotropic self-assembled structure of claim 1 comprising a substantially two-dimensional sheet of the grafted nanoparticles within the polymeric matrix, the sheet having a length and a breadth of at least one micron respectively, wherein the sheet is about 2-5 nanoparticles in thickness.

15. The anisotropic self-assembled structure of claim 1 comprising a plurality of three dimensionally interconnected structures where the width of each of the three dimensionally interconnected structures is 1-10 nanoparticles.

16. The anisotropic self-assembled structure of claim 1 wherein the anisotropic self-assembled structure in the polymeric matrix comprises about 1-10% of a weight of the inorganic core.

17. The anisotropic self-assembled structure of claim 11 comprising a plurality of layers of the substantially two-dimensional sheets in a stack.

18. A method of preparing the anisotropic self-assembled structure of claim 1, the method comprising forming a dispersion of a plurality of the grafted nanoparticles in the polymeric matrix, then, annealing the residue at a temperature above a glass transition temperature of the polymeric matrix for a duration of time sufficient to bring about formation of the anisotropic self-assembled structure within the polymeric matrix.

19. The method of claim 18 wherein substantially all of the plurality of grafted nanoparticles have a respective inorganic core comprising silica.

20. The method of claim 18 wherein substantially all of the plurality of grafted nanoparticles comprise an inorganic core with an average particle diameter of about 14±4 nm.

21. The method of claim 18 the brush structure comprises polystyrene and $M_g$ is about 100-120 kDa, or the brush structure comprises poly(methylmethacrylate) and $M_g$ is about 85 kDa.

22. The method of claim 18 wherein the brush structure comprises polystyrene chains.

23. The method of claim 18 wherein there are about 25-45 grafted polymeric organic chains per nanoparticle.

24. The method of claim 18 wherein the polymeric matrix comprises polystyrene or polymethylmethacrylate.

25. The method of claim 18 wherein the polymeric matrix has a weight average molecular weight of greater than about 150 kDa.

26. The method of claim 18 wherein the polymeric matrix comprises poly(methylmethacrylate) having a weight average molecular weight of greater than about 180 kDa.

27. The method of claim 18 wherein the anisotropic self-assembled structure comprises a one-dimensional string of the drafted nanoparticles within the polymeric matrix, the string having a width of one nanoparticle and a length of 2-10 nanoparticles.

28. The method of claim 18 wherein the anisotropic self-assembled structure comprises a substantially two-dimensional sheet of the grafted nanoparticles within the polymeric matrix, the sheet having a length and a breadth of at least one micron respectively, wherein the sheet is about 2-5 nanoparticles in thickness.

29. The method of claim 18 wherein the anisotropic self-assembled structure comprises a plurality of three dimensionally interconnected structures where the width of each of the structures is 1-10 nanoparticles.

30. The method of claim 18 wherein the anisotropic self-assembled structure in the polymeric matrix comprises about 1-10 wt % of the inorganic core.

31. The method of claim 18 comprising forming the dispersion in a solvent, then casting the dispersion on a surface, then removing the solvent.

32. The method of claim 18 wherein the annealing temperature is greater than about 150° C.

33. The method of claim 18 wherein the annealing temperature is greater than about 200° C.

34. The method of claim 18 wherein the annealing time is about 1 to about 20 days.

35. A synthetic substitute for bone or tooth enamel comprising the anisotropic self-assembled structure of claim 1.

36. A fuel cell comprising the anisotropic self-assembled structure of claim 1.

37. A flame-retardant material comprising the anisotropic self-assembled structure of claim 1.

38. An electroconductive material comprising the anisotropic self-assembled structure of claim 1.

39. The anisotropic self-assembled structure of claim 1, wherein
   (a) the polymeric matrix and the organic brush structure each comprise polystyrene, or
   (b) the polymeric matrix and the brush structure each comprise polymethylmethacrylate
   (c) both (a) and (b).

* * * * *